United States Patent
Chen et al.

(10) Patent No.: US 7,911,592 B2
(45) Date of Patent: Mar. 22, 2011

(54) METHOD AND SYSTEM FOR IDENTIFYING MOVING OBJECT, AND METHOD AND SYSTEM FOR INSPECTING MOVING OBJECT BY RADIATION IMAGING

(75) Inventors: Zhiqiang Chen, Beijing (CN); Yuanjing Li, Beijing (CN); Yinong Liu, Beijing (CN); Junli Li, Beijing (CN); Hua Peng, Beijing (CN); Yaohong Liu, Beijing (CN); Shangmin Sun, Beijing (CN); Jinyu Zhang, Beijing (CN); Qingjun Zhang, Beijing (CN); Li Zhang, Beijing (CN); Yali Xie, Beijing (CN); Yanli Deng, Beijing (CN); Ming Ruan, Beijing (CN); Siyuan Liang, Beijing (CN); Guang Yang, Beijing (CN); Wei Jia, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 280 days.

(21) Appl. No.: 11/997,465

(22) PCT Filed: Dec. 25, 2006

(86) PCT No.: PCT/CN2006/003574
§ 371 (c)(1),
(2), (4) Date: Feb. 27, 2008

(87) PCT Pub. No.: WO2008/046261
PCT Pub. Date: Apr. 24, 2008

(65) Prior Publication Data
US 2009/0316136 A1    Dec. 24, 2009

(30) Foreign Application Priority Data
Oct. 13, 2006    (CN) .......................... 2006 1 0113716

(51) Int. Cl.
*G01C 3/08* (2006.01)

(52) U.S. Cl. ........................................................ 356/28
(58) Field of Classification Search ..................... 356/28
See application file for complete search history.

(56) References Cited

U.S. PATENT DOCUMENTS 5,392,034 A * 2/1995 Kuwagaki ..................... 340/933
(Continued)

FOREIGN PATENT DOCUMENTS

EP            1 048 961 A2    4/2000
(Continued)

OTHER PUBLICATIONS

International Search Report and Written opinion for PCT/CN2006/003574, 9 pages.

(Continued)

*Primary Examiner* — Thomas H Tarcza
*Assistant Examiner* — Luke D Ratcliffe
(74) *Attorney, Agent, or Firm* — Westman, Champlin & Kelly, P.A.

(57) ABSTRACT

Disclosed is a method for identifying a moving object, comprising: a driving-in step of moving a moving object into a passage, a velocity measuring step of measuring a moving velocity of the moving object, a light beam emitting step of emitting light beams from one side of the passage, a light beam receiving step of receiving the light beams not shielded by the moving object at other side of the passage, a profile determining step of determining a profile of at least one portion of the moving object based on the received light beams and the measured moving velocity of the moving object, and an identifying step of determining type of the moving object by comprising the profile of the at least one portion of the moving object with information of moving objects stored previously. The method and the system according to the present invention can adopt corresponding scanning controlling manners for different vehicles, so that inspection information of inspected vehicles is complete, inspection images are of high quality, and radiation dose received by drivers are minimal.

12 Claims, 3 Drawing Sheets

U.S. PATENT DOCUMENTS

| | | | |
|---|---|---|---|
| 6,614,536 B1 | 9/2003 | Doemens et al. | 356/601 |
| 6,778,263 B2 * | 8/2004 | Ortyn et al. | 356/28 |
| 2002/0140924 A1 | 10/2002 | Wangler et al. | 356/28 |
| 2004/0249561 A1 * | 12/2004 | Capozzi et al. | 701/117 |

FOREIGN PATENT DOCUMENTS

| | | |
|---|---|---|
| EP | 1 048 961 A3 | 4/2000 |
| JP | 10105870 | 4/1998 |
| JP | 11167625 | 6/1999 |
| JP | 11203588 | 7/1999 |
| JP | 2003051088 | 2/2003 |
| KR | 2002-0076006 | 9/2002 |
| WO | WO 00/07164 | 2/2000 |
| WO | WO 03/052457 | 6/2003 |

OTHER PUBLICATIONS

European Search Report from corresponding application Serial No. 06828445.4-2215, dated May 17, 2010.

* cited by examiner

METHOD AND SYSTEM FOR IDENTIFYING MOVING OBJECT, AND METHOD AND SYSTEM FOR INSPECTING MOVING OBJECT BY RADIATION IMAGING

CROSS-REFERENCE TO RELATED APPLICATION

This Application is a Section 371 National Stage Application of International Application No. PCT/CN2006/003574, filed Dec. 25, 2006 not yet published, the content of which is hereby incorporated by reference in its entirety

BACKGROUND OF THE INVENTION

1. Field of the Invention

An embodiment of the present invention relates to a method and a system both for identifying moving objects, particularly, to a method and a system both for inspecting moving objects by radiation imaging in such a manner that different moving objects are inspected by means of different radiation beams.

2. Description of the Related Art

In an apparatus for quickly inspecting a vehicle by means of radiation imaging with high energy rays, in order to automatically avoid radiating a cab of the vehicle, generally, after a front most end of the vehicle has traveled to a preset position in a direction of an outlet of a passage, a system performs scanning so as to inspect the vehicle. However, because outer profiles of different vehicles vary greatly, with this manner, it must assure to safely avoid radiating a cab of a vehicle having the largest cab. In this case, when a small vehicle is inspected, image information on the small vehicle will not be complete, and even some small vehicle cannot be inspected. When a container lorry is inspected, unnecessary information exists in an inspection image. This inspecting method limits energy and dose ratio, and as a result, some vehicle cannot be inspected. The inspection image is low in index, has unnecessary information, or is incomplete in information. Furthermore, this inspecting method cannot ensure that radiation dose received by a driver is minimal. Therefore, there is a need for a system for identifying outer profiles of vehicles, which can automatically classify the vehicles according to their usage, to provide a quick inspection system with an appropriate scanning solution.

A conventional vehicle type identifying system for charging toll only measures height and length of a vehicle, so as to judge toll standard based on the size of the vehicle. However, the conventional vehicle type identifying system cannot classify the vehicle on the basis of the usage of the vehicle and cannot identify whether a vehicle is a passenger car or a freight car.

SUMMARY OF THE INVENTION

In order to overcome at least one aspect of the above defects existing in the prior art, it is an object of the present invention to provide a method and a system both for identifying moving objects, and a method and a system both for inspecting moving objects by radiation imaging, which can automatically identify types of vehicles running normally at a velocity within a certain range, and adopt different scanning control manners to automatically image and inspect the vehicles depending on the different types of the vehicles. The types of the vehicle are automatically identified and inspected without the need for drivers getting out of the vehicles. And radiation dose received by the drivers is minimal under the conditions that the completeness of the image information is ensured.

In accordance with an aspect of the present invention, there is provided a method for identifying a moving object, comprising: a driving-in step of moving a moving object into a passage, a velocity measuring step of measuring a moving velocity of the moving object, a light beam emitting step of emitting light beams from one side of the passage, a light beam receiving step of receiving the light beams not shielded by the moving object at other side of the passage, a profile determining step of determining a profile of at least one portion of the moving object based on the received light beams and the measured moving velocity of the moving object, and an identifying step of determining type of the moving object by comparing the profile of the at least one portion of the moving object with information of moving objects stored previously.

In accordance with another aspect of the present invention, there is provided a system for identifying a moving object, comprising: a passage through which a moving object passes; a velocity measuring device for measuring a moving velocity of the moving object; a light emitting device and a light receiving device, wherein the light emitting device disposed on one side of the passage for emitting light beams toward an inside or interior of the passage and the light receiving device disposed on other side of the passage for receiving the light beams not shielded by the moving object; a profile determining device adapted to determine a profile of at least one portion of the moving object based on the light beams received by the light receiving device and the moving velocity of the moving object measured by the velocity measuring device; and an identifying device adapted to determine type of the moving object by comparing the profile of the at least one portion of the moving object with information of moving objects stored previously.

In accordance with further aspect of the present invention, there is provided a method for inspecting a moving object by radiation imaging, comprising: the above method for identifying the moving object, and an inspecting step of determining whether or not the moving object is to be inspected by radiation imaging and determining a manner in which the moving object is to be inspected by the radiation imaging, based on the identified type of the moving object.

In accordance with still further aspect of the present invention, there is provided a system for inspecting a moving object by radiation imaging, comprising: the above system for identifying the moving object, and a scanning imaging inspection device adapted to determine whether or not the moving object is to be inspected by radiation imaging based on the identified type of the moving object.

The controlling of the present invention is characterized that ground induction coils are installed at an inlet and an outlet of the passage; an optical detecting device and a real-time velocity detecting radar are installed at both sides of the passage adjacent to an accelerator chamber body; and photoelectric switches are installed on both sides of the passage at an appropriate distance from an accelerator beam slot in a direction towards the passage outlet. A scanning controlling logic controller synthetically judges information such as positions of vehicles, number of the vehicles in the passage, running states of the vehicles and the like based on changes in states of the respective sensors, and controls the operation of a scanning system such as avoiding radiating a driver, emitting beams for scanning, and stopping scanning. The real-time velocity detecting radar detects a running velocity of a vehicle in a real-time manner and provides an accelerator with a real-time scanning trigger pulse. The accelerator, a detector, and an imaging device perform scanning imaging based on the scanning trigger pulse obtained by detecting the velocity. A shielding means is used to assure that radiation dose to which the environment around the equipment is subject is limited to a statutory range. The present invention adopts a series of controlling methods to assure the safety of the drivers.

With the above controlling concept, the present invention adopts the corresponding scanning controlling manners for different vehicles, so that inspection information of the vehicles to be inspected is complete, inspection images are high in index, and radiation dose received by drivers are minimal. The present invention can greatly improve index of the images of the vehicles to be inspected, can increase type of vehicles to be inspected, and greatly decrease the radiation dose received by drivers. Therefore, a quick radiation imaging inspection apparatus is used at inspection stations of highways.

The present invention will be further explained in conjunction with the embodiments and the accompanying.

DETAILED DESCRIPTION OF THE EMBODIMENTS

Structure and operation process of a vehicle inspecting apparatus as an illustrative embodiment of the present invention are described in detail below with reference to FIGS. 1-2.

Figure 1:
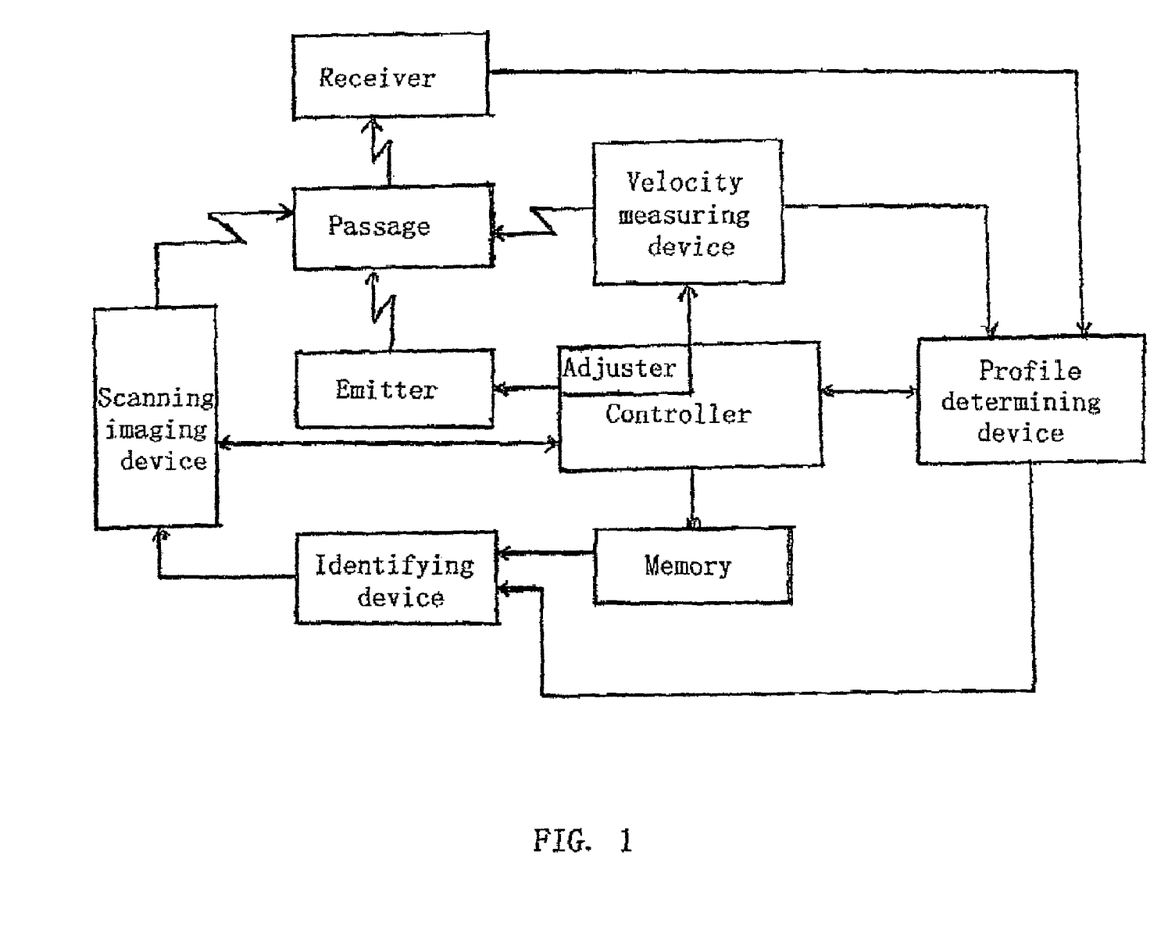
FIG. 1 is a block diagram of a system for identifying a moving object according to an embodiment of the present invention.

Referring to FIG. 1, a block diagram of a system for identifying a moving object and a system for quickly inspecting the moving object by radiation imaging according to the present invention is shown. The system for identifying a moving object comprises: a passage through which a moving object to be inspected, such as those carrying container, passes; a velocity measuring device for measuring a moving velocity of the moving object; a light emitting device and a light receiving device, wherein the light emitting device is disposed on one side of the passage for emitting light beams toward an inside or interior of the passage and the light receiving device is disposed on other side of the passage for receiving the light beams passing through the moving object; a profile determining device adapted to determine a profile of at least one portion of the moving object based on the light beams received by the light receiving device and the moving velocity of the moving object measured by the velocity measuring device; and an identifying device adapted to determine a type of the moving object by comparing the profile of at least one portion of the moving object determined by the profile determining device with information of vehicles stored previously. For example, the identifying device determines whether the moving object is a container lorry, a van truck, a passenger car, a car or a pedestrian.

Figure 2:
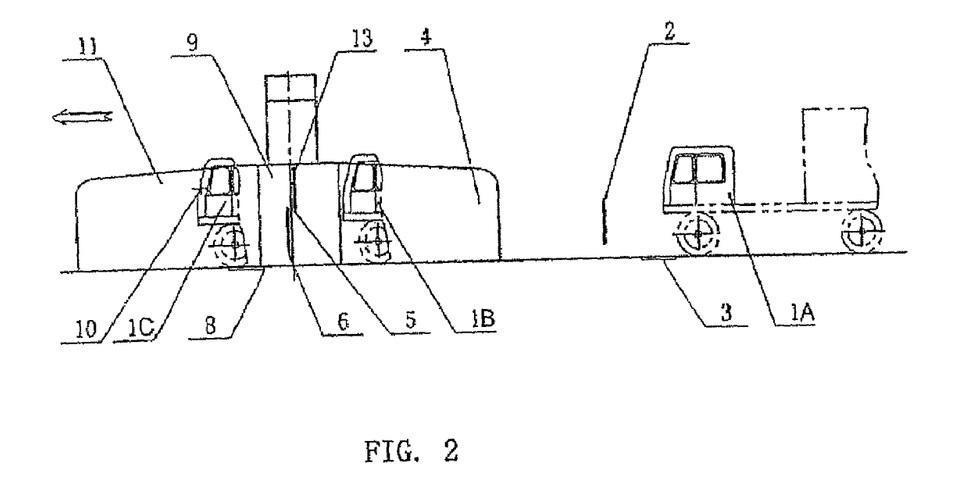
FIG. 2 is a schematic view showing a structure of a system for identifying a moving object according to the embodiment of the present invention
Figure 3:
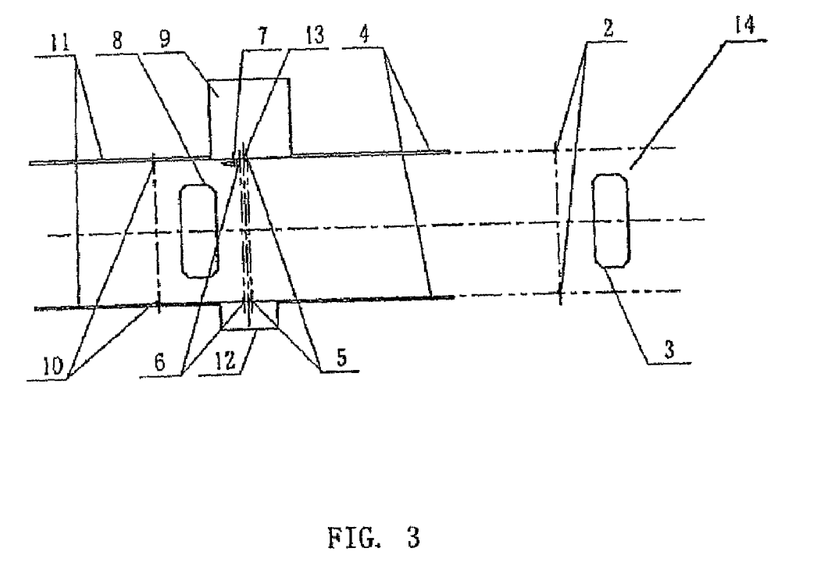
FIG. 3 is a schematic plan view of the system of FIG. 1.

More specifically, referring to FIGS. 2 and 3, in the system for identifying a moving object according to the present invention, the passage 14 through which the moving object to be inspected, such as those carrying the containers, passes may be disposed at spots where coming and going freight vehicles are identified and inspected, such as the Custom, a dock, a freight checking station of an airport, and a freeway. Fast response light curtain sensors 2 and a ground induction coil sensor 3 for detecting whether or not a vehicle runs into the passage are provided at an inlet of the passage. Preferably, the fast response light curtain sensors 2 are mounted on mounting posts on both sides of the passage, and the ground induction coil sensor 3 as a first switch for a vehicle inlet is embedded under a ground surface (adjacent to a right side of FIG. 2) at the inlet of the passage. The light curtain sensors 2 and the ground induction coil sensor 3 cooperate to judge whether or not a moving object enters into the passage and to count vehicles which have entered into the passage by a first counter. The first counter may be disposed in the fast response light curtain sensors 2 and/or the ground induction coil sensor 3, or may be provided at a control room or may be arranged separately.

A velocity detecting radar 7 for detecting a moving velocity of the vehicle and a control room (not shown) are disposed in the passage. The velocity detecting radar 7 for detecting a moving velocity of a moving object to be inspected may be mounted on an outer wall of an accelerator chamber 9 adjacent to the passage 9 in the embodiment. Alternatively, the velocity detecting radar as a velocity detecting device may be replaced with other detecting devices which obtain a velocity of a moving object by measuring a displacement and a time of displacement of the moving object. The control room is a center of the entire system. A control unit disposed in the control room may be electrically connected with other electronic devices in the system to receive electrical signals of the other electronic devices and to send control signals to the other electrical signals so as to control their operation state.

Vertical shielding walls 4 and 11 are disposed on both sides of the passage to prevent radiation from penetrating therethrough. Vertical detector arms 12 are arranged outside the shielding walls 4 and 11. Optical detecting devices 5 each comprising an emitter and a receiver are disposed on the detector arms 12 on both sides of the passage, respectively. Preferably, the both sides are right side and left side in a transverse direction of a moving object, respectively. Alternatively, the both sides may be upper side and lower side of the moving object, respectively. A light beam emitted from the emitter passes through a slot structure, and is formed into a parallel light beam whose projection on a plane perpendicular to both an emitting direction thereof, and the ground surface may have a shape of a straight line. It can be understood that the parallel light beam should have a height higher than that of a moving object, so that after the light beam emitted from the emitter is shielded by the moving object, a portion of the light beam still reaches the receiver. In this case, a height of a part of the light beam shielded by the moving object represents a height of the moving object. In other words, size of the portion of the light beam received by the receiver corresponds to the height of the moving object.

The emitter emits the parallel light beam towards the moving object moving in the passage through the slot structure. The portion of the light beams not shielded by the moving object is received by the receiver in a direction perpendicular to a moving direction of the moving object. Accordingly, photoelectric sensors of a corresponding amount are disposed in the receiver to convert received light signals into electrical signals at a predetermined frequency. Every time the photoelectric sensors convert the received light signals into the electrical signals, sampling is performed once so that a set of sampled signals are obtained. It can be understood that each set of sampled signals correspond to a height of a portion of the moving object which is scanned by the light beam from the emitter at a time of sampling.

In the system for identifying a moving object according to the present invention, a profile determining device is preferably disposed in the control room. Each set of sampled signals generated by the receiver and signals indicative of the moving velocity of the moving object which are detected by the velocity detecting radar are transmitted to the profile determining device. The profile determining device determines a profile of at least one portion of the moving object based on each set of sampled signals generated by the receiver and the signals detected by the velocity detecting radar.

Specifically, the profile determining device starts to process one set of sampled signals received from the receiver since a time $T_0$. It can be known from the above description that a height $H_0$ of a portion of the moving object which is being scanned by the light beam from the emitter at a time of sampling at the time $T_0$ can be obtained directly from the one set of sampled signals, and a width $W_0$ of a portion of the moving object which has been scanned at the time $T_0$ (i.e., a distance that has traveled or that has be moved since the time $T_0$) is 0. Thus an area that has been scanned at the time $T_0$ is given by $$S_0 = H_0 \times W_0 = 0.$$

When the moving object is scanned for the second time at a time $T_1$, a height $H_1$ of a portion of the moving object which is being scanned from the emitter at a time of sampling at the time $T_1$ can be obtained directly from a second set of sampled signals. Assuming that the object moves uniformly at a velocity $V_1$ then a width $W_1$ of a portion of the moving object which has been scanned since the time $T_0$ is a product of the moving velocity V and a time difference between the time $T_1$ and the time $T_1$.

i.e. $W_1 = V \times (T_1 - T_0)$.

Hence, an area that has been scanned since the time $T_0$ is $$S_1 = H_1 \times W_1 = H_1 \times V \times (T_1 - T_0).$$

Similarly, an area of a portion of the moving object that has been scanned since a time $T_{n-1}$ when the scanning is performed at a time $T_n$ can be found as follows:

$$S_n = H_n \times W_n = H_n \times V \times (T_n - T_{n-1}).$$

In this way, n scanned areas which can be obtained by sampling n times may be superposed to get a profile similar to the scanned moving object.

The system for identifying a moving object according to the present invention further comprises a storing device for storing information of partial profiles of moving objects. The information stored in the storing device may be information of profiles of special portions of vehicles such as head portions of the vehicles, or side portions of pedestrians. The vehicles comprise those carrying passengers or freight such as a container lorry, a van truck, a passenger car, and a car. When the entire system for identifying a: moving object is set, the information of the profiles of the special portions of these vehicles is obtained by means of projection, and stored in the storing device. The special portions correspond to partial profiles of the moving objects which are to be obtained when the moving objects are identified. For example, both the special portions and the partial profiles are profiles of head portions of the vehicles. In a case of a pedestrian, a profile of the entire pedestrian is obtained. Furthermore, information vehicles stored in the storing device can be updated at any moment, as vehicles with new profiles are put into the market.

The identifying device compares the profile of the moving object determined by the profile determining device with information of the vehicles, which is stored previously in the storing device, one by one under control of the control unit until the profile of the moving object (for example, a container lorry) determined by the profile determining device is consistent with information of a moving object (for example, a container lorry) stored previously in the storing device. As a result, specific type of the moving object passing through the passage 14 is determined. For example, the moving object is a container lorry.

Furthermore, if the specific type of the moving object is identified, for example, if the moving object is the container lorry, then the control unit starts a scanning imaging device 13 to emit a radiation beam to a container, thereby starting to inspect freight carried by the container lorry. Thus, a system for inspecting a moving object by radiation imaging according to the present invention is constituted. If the identified moving object is a passenger car, a car, a pedestrian or the like, then the control unit does not start the scanning imaging device to emit the radiation beam. In an embodiment, the scanning imaging device 13 is disposed on the wall of the accelerator chamber 9 on both sides of the passage 14.

In addition, the system for identifying a moving object according to the present invention further comprises, for example, an adjuster disposed in the control unit which adjusts a frequency at which the receiver converts the received light beam into an electrical signal, that is, an interval between two samples based on the moving velocity of the moving object detected by the velocity detecting radar. Therefore, a sampling frequency of the receiver corresponds to the moving velocity of the moving object.

Moreover, further fast response light curtain sensors 10 are provided on the shielding walls on both sides of the passage 14, and a ground induction coil sensor 8 is provided under the ground surface in the passage 14 near the outlet (left side of FIG. 2). The fast response light curtain sensors 10 and the ground induction coil sensor 8 cooperate to judge whether of not an inspected vehicle has left the passage and to count vehicles which have run out of the passage by a second counter. The second counter may be disposed in the fast response light curtain sensors 6 and/or the ground induction coil sensor 8, or may be provided at the control room or may be arranged separately.

The scanning imaging device may be apparatuses in any forms which inspects an object to be inspected by radiating radiation beams such as X-rays, and γ-rays, especially conventional radiation imaging devices for inspecting containers. The scanning imaging device comprises: an accelerator for emitting radiation beams to scan moving objects such as vehicles to be inspected which can adjust a frequency of the radiation beams and thus control a frequency of scanning a vehicle based on the velocity of the vehicle detected by the velocity measuring radar 7 under the control of the control unit; a detector for receiving the radiation beams penetrating the inspected moving object; an imaging device forming an image based on the radiation beams penetrating the inspected moving object which are detected by the detector; and a radiation shielding means for assuring that amount of the radiation beams around the equipment is limited to an allowable range so as to protect workers who possibly approach surroundings of the equipment from being injured by the radiation beams.

In the above embodiment according to the present invention, the fast response light curtain sensors 2, 10 and the ground induction coil sensors 3, 8 for detecting whether vehicles run into or out of the passage are described, but the present invention is not limited thereto. For example, only one of the light curtain sensors and the ground induction coil sensors may be used for detecting whether vehicles have run into or out of the passage. It needs to be explained that according to property of the ground induction coil sensor, only when contacting area between a moving object moving in the passage 14 and the ground induction coil sensor reaches a certain degree, can the ground induction coil sensor generate a signal of detecting the moving object (a positive signal).

Furthermore, light curtain sensors 2, 10 may be replaced by conventional photoelectric detectors. Alternatively, the ground induction coil sensors 3, 8 may be replaced with at least one of photoelectric detectors, piezoelectric detectors, electronic sensors, microwave sensors, ultrasonic sensors, and pressure sensors.

Figure 4:
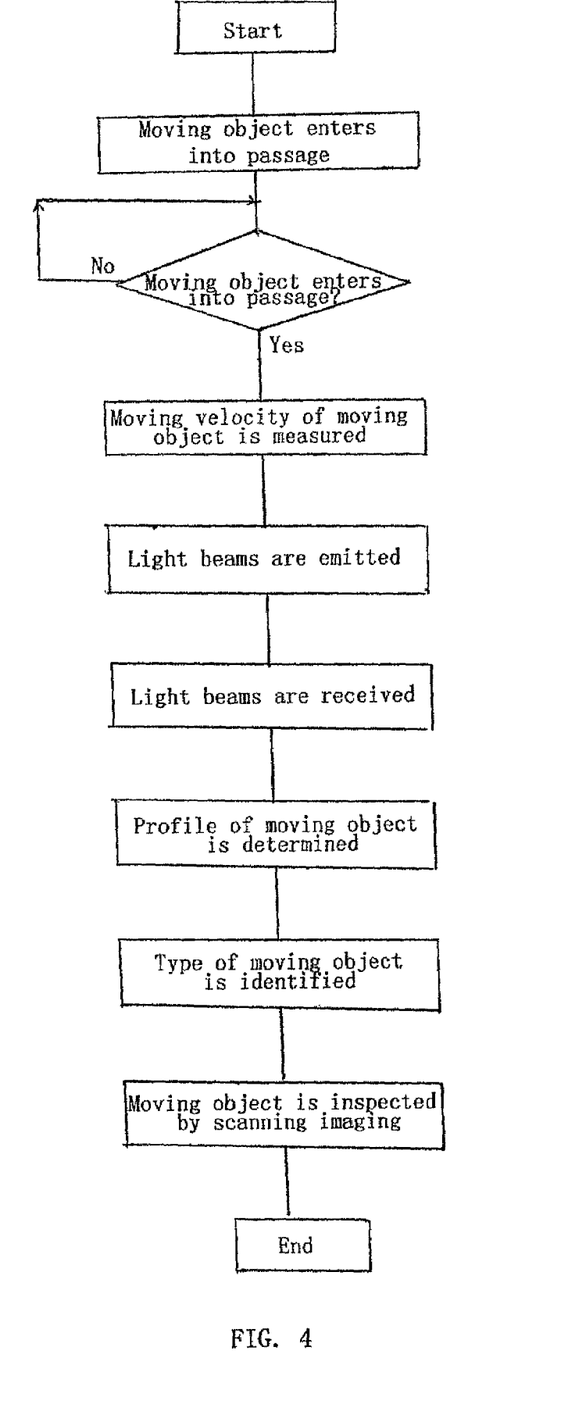
FIG. 4 is a flow diagram of a method for identifying a moving object in term of type of a vehicle.

Referring to FIG. 1, according to another aspect of the present invention, there is provided a method for identifying a moving object. The method comprises a driving-in step (S10) of moving a moving object such as a container lorry, a van truck, a passenger car, or a car into the passage 14, a velocity measuring step (S20) of measuring a moving velocity of the moving object moving in the passage 14 by a velocity detecting device such as the velocity detecting radar 7, and a light beam emitting step (S30) of emitting light beams toward the moving object from one side of the passage by the emitter. Projection of the light beams on a plane perpendicular to both an emitting direction thereof and the ground surface may be in a straight line shape, or a planar shape having a width.

At a light beam receiving step (S40), the light beams not shielded by the moving object are received by the receiver at the other side of the passage, and signals of the light beams are converted into electrical signals by a plurality of the photoelectric sensors disposed in the receiver. In this case, a height of the light beams shielded by the moving object represents a height of the moving object, and the converted electrical signals correspond to a height of a portion of the moving object which is scanned by the light beams from the emitter at a time of sampling. Furthermore, at the light beam receiving step, a frequency at which the received light beams are converted into electrical signals is adjusted based on the moving velocity of the moving object, so that the converting frequency corresponds to the measured moving velocity of the moving object.

Next, at a profile determining step (S50), a profile of at least one portion of the moving object is determined by the profile determining device based on the electrical signals generated by the receiver and the measured moving velocity of the moving object.

At an identifying step (S60), the determined profile of the at lease one portion is compared by means of the identifying device with information of respective profiles of corresponding portions of moving objects, which is stored previously in the storing device in an one-by-one manner until the determined profile of the moving object (for example, a container lorry) is consistent with information of a moving object (for example, a container lorry) stored previously in the storing device. As a result, specific type of the moving object passing through the passage 14 is determined. For example, the moving object is a container lorry.

In addition, there is provided a method for inspecting a moving object by radiation imaging. The method comprises, for example, identifying type of a moving object by the above method for identifying a moving object, and an inspecting step (70) of determining, by the scanning imaging device based on the identified type of the moving object, whether or not the moving object is to be inspected with radiation imaging. If the identified moving object is a passenger car, a car, a pedestrian or the like, then the control unit does not start the scanning imaging device to emit the radiation beam. If the identified moving object is a freight vehicle such as a container lorry, then the control unit starts the scanning imaging device to emit the radiation beam so as to start to inspect the moving object by the radiation beam. Furthermore, a manner of the radiation imaging inspection is determined by specific type of the freight vehicle. For example, if the moving object is a container lorry, then a delay time is longer so that the container lorry is inspected by the radiation beam after a cab thereof has passed through a scanning area of the radiation beam, thereby protecting a driver thereof. If the moving object is a van truck, then the delay time is shorter.

The method for identifying a moving object and the method for inspecting a moving object by radiation imaging according to the present invention further comprises judging whether or not a moving object such as a vehicle has entered into the passage (S11). If it is judged that the moving object has entered into the passage, an identifying procedure starts.

An operation process of the present invention is described below with reference to an example identifying and inspecting a vehicle entering into the passage.

When the number of vehicles in the passage is zero, the system is on standby. When one vehicle 1A runs toward the passage, the ground induction coil sensor 3 is firstly activated, and conducts judgment of entrance of the vehicle into the passage and a running direction thereof together with the fast response light curtain sensors 2. If a vehicle moves into the passage, 1 is added to a count value of a first counter indicative of number of vehicles in the passage, the velocity detecting radar 7 measures a running velocity of the vehicle, and the system comes into a ready state. As the vehicle runs forward, the optical detecting device 5 measures external profile characteristics of the vehicle in real time. The system judges whether the passing vehicle is a container lorry, a van truck, or a passenger car based on a notable characteristic or an external profile characteristic of the vehicle, and adopts a corresponding scanning strategy based on the result of the judgement. For a container lorry, the system adopts a strategy in which an effective length of the container is scanned so that no unnecessary information is generated. For a van truck, the system adopts a strategy in which the system starts the scanning inspection only after a cab thereof has left a ray plane and has reached a position at a safe distance therefrom so as to ensure safety of a driver. For a passenger car, the system adopts a strategy in which a scanning inspection is not carried out, or is carried out with an allowable dose in a case where this is permissive under laws and regulations. When a cab is passing through the scanning area, the system monitors an operation state of the accelerator in real time so as to assure that the accelerator cannot emit the beams unexpectedly. When the vehicle has run out of the scanning passage, 1 is added to a count value of a second counter indicative of number of vehicles in the passage. So long as the count value of the first counter and the count value of the second counter are not equal to each other, the scanning imaging device of the inspecting equipment is kept at the ready state. When the two count values are equal to each other, the scanning imaging device comes into a standby condition.

Alternatively, the first counter and the second counter can be replaced by a receiver. That is, when a vehicle runs into the passage, the counter adds 1, and when a vehicle runs out of the passage, 1 is subtracted from the count value. So long as the count value of the counter is not zero, the system is kept at a state to continue operation. When the count value is zero, the system comes into a standby condition.

It should be noted that in accordance with the technical solution of the present invention, the technical features in the above embodiments including the optical detecting device may be replaced by equivalent technical features as follows. For example, appearance of a vehicle is detected by a plurality of photoelectric switches arranged at intervals. Generally speaking, the replacement of these technical features with technical schemes formed by techniques well known by a person having ordinary skill in the art should fall within the scope of the present application.

In addition, although the emitter and the receiver are respectively located on the left side and the right side of the passage in a transverse direction of a vehicle in the embodiments of the present invention, it is apparent that the light emitting device and the light receiving device can be located on upper side and lower side of a vehicle. In this case, one of the light emitting device and the light receiving device can be disposed on a frame, and the other one of the light emitting device and the light receiving device can be disposed under the surface of the passage.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for inspecting a moving object by radiation imaging, comprising:
    a driving-in step of moving a moving object into a passage,
    a velocity measuring step of measuring a moving velocity of the moving object,
    a light beam emitting step of emitting light beams from one side of the passage,
    a light beam receiving step of receiving the light beams not shielded by the moving object at the other side of the passage,
    a profile determining step of determining a profile of at least one portion of the moving object based on the received light beams and the measured moving velocity of the moving object,
    an identifying step of determining type of the moving object by comparing the profile of the at least one portion with information of moving objects stored previously;
    an inspecting step of determining whether or not the moving object is to be inspected by radiation imaging and determining a method in which the moving object is to be inspected by the radiation imaging based on the identified type of the moving object, wherein:
    if the identified moving object is a passenger car, then the identified moving object is not inspected, or is inspected with an allowable radiation dose; and
    if the identified moving object is a freight vehicle, then inspection of the identified moving object is started after a cab of the freight vehicle has passed through a scanning area of radiation beam, thereby protecting a driver of the vehicle.

2. The method for inspecting a moving object by radiation imaging according to claim 1, wherein at the light beam receiving step, a converting frequency at which the received light beams are converted into electrical signals is adjusted based on the moving velocity of the moving object, so that the converting frequency conforms with the measured moving velocity of the moving object.

3. The method for inspecting a moving object by radiation imaging according to claim 1, wherein at the light beam receiving step, the received light beams are converted into electrical signals.

4. The method for inspecting a moving object by radiation imaging as to vehicle type according to claim 1, wherein at the driving-in step, the method further comprises a step of detecting whether or not the moving object has entered into the passage.

5. The method for inspecting a moving object by radiation imaging as to vehicle type according to claim 1, wherein a projection of the emitted a light beams on a plane perpendicular to an emitting direction thereof has a shape of a straight line.

6. The method for inspecting a moving object by radiation imaging according to claim 4, wherein the emitted light beams are parallel beams.

7. The method for inspecting a moving object by radiation imaging according to claim 1, wherein the one side and the other side are right side and left side in a transverse direction of the moving object, respectively, or upper side and lower side of the moving object, respectively.

8. A system for inspecting a moving object by radiation imaging, comprising:
    a passage through which a moving object passes,
    a velocity measuring device for measuring a moving velocity of the moving object,
    a light emitting device and a light receiving device, wherein the light emitting device is disposed on one side of the passage for emitting light beams toward an inside of the passage and the light receiving device is disposed on the other side of the passage for receiving the light beams not shielded by the moving object,
    a profile determining device adapted to determine a profile of at least one portion of the moving object based on the light beams received by the light receiving device and the moving velocity of the moving object measured by the velocity measuring device,
    an identifying device adapted to determine type of the moving object by comparing the profile of the at least one portion with information of moving objects stored previously,
    a scanning imaging inspection device adapted to determine whether or not the moving object is to be inspected by radiation imaging and determine a method in which the moving object is to be inspected by the radiation imaging based on the identified type of the moving object, wherein:
    if the identified moving object is a passenger car, then the identified moving object is not inspected, or is inspected with an allowable radiation dose; and
    if the identified moving object is a freight vehicle, then inspection of the identified moving object by the scanning imaging inspection device is started after a cab of the freight vehicle has passed through a scanning area of radiation beam, thereby protecting a driver of the vehicle.

9. The system for inspecting a moving object by radiation imaging according to claim 8, further comprising an adjuster for adjusting a converting frequency at which the light receiving device converts the received light beams into electrical signals based on the moving velocity of the moving object measured by the velocity measuring device, so that the converting frequency conforms with the measured moving velocity of the moving object.

10. The system for inspecting a moving object by radiation imaging according to claim 8, wherein the light receiving device converts the received light beams into electrical signals.

11. The system for inspecting a moving object by radiation imaging according to claim 8, further comprising a first detecting device disposed at an inlet of the passage for judging whether or not a moving object has entered into the passage.

12. The system for inspecting a moving object by radiation imaging according to claim 8, wherein the one side and the other side are right side and left side in a transverse direction of the moving object, respectively, or upper side and lower side of the moving object, respectively.

* * * * *